United States Patent
Hall et al.

(10) Patent No.: US 8,250,953 B2
(45) Date of Patent: Aug. 28, 2012

(54) TRIPPER ASSEMBLY FOR A CLAMSHELL LATHE

(75) Inventors: J. Randall Hall, Wadsworth, OH (US); Robert E. Cormany, Barberton, OH (US)

(73) Assignee: H&S Tool, Inc., Wadsworth, OH (US)

( * ) Notice: Subject to any disclaimer, the term of this patent is extended or adjusted under 35 U.S.C. 154(b) by 485 days.

(21) Appl. No.: 12/655,263

(22) Filed: Dec. 28, 2009

(65) Prior Publication Data

US 2010/0162862 A1    Jul. 1, 2010

Related U.S. Application Data

(60) Provisional application No. 61/204,041, filed on Dec. 31, 2008.

(51) Int. Cl.
*B23B 25/00* (2006.01)
*B23B 3/22* (2006.01)

(52) U.S. Cl. ............................................. 82/113; 82/128

(58) Field of Classification Search ............ 82/113, 82/46, 70.2, 131, 128, 152, 153; 83/637; 409/138, 140
See application file for complete search history.

(56) References Cited

U.S. PATENT DOCUMENTS

| | | |
|---|---|---|
| 4,236,428 A | 12/1980 | Feamster, III |
| 4,342,239 A | 8/1982 | Feamster, III |
| 4,369,679 A | 1/1983 | Jones |
| 4,397,202 A | 8/1983 | Mayfield et al. |
| 4,550,635 A | 11/1985 | Kanayama et al. |
| 4,656,898 A | 4/1987 | Hunt et al. |
| 4,739,685 A | 4/1988 | Ricci |
| 4,762,038 A | 8/1988 | Olson |
| 4,791,842 A | 12/1988 | Olson |
| 4,823,655 A | 4/1989 | VanderPol |
| 4,939,964 A | 7/1990 | Ricci |
| 4,944,205 A * | 7/1990 | Ricci .............................. 82/113 |
| 5,054,342 A | 10/1991 | Swiatowy et al. |
| 5,603,250 A * | 2/1997 | Robinson ........................ 82/56 |
| 5,685,996 A * | 11/1997 | Ricci ....................... 219/121.39 |
| 5,881,618 A * | 3/1999 | Ricci et al. ...................... 82/128 |
| 6,038,947 A * | 3/2000 | Tremblay ........................ 82/113 |
| 6,257,110 B1 | 7/2001 | Ricci et al. |

(Continued)

FOREIGN PATENT DOCUMENTS

WO    WO 2008/052106 A2    5/2008

OTHER PUBLICATIONS

"*Portable Pipe Lathe, Operations & Maintenance Manual*," Aggressive Equipment, Inc., No date given, Rock Hill, SC 29730, pp. 1-30.

(Continued)

*Primary Examiner* — Will Fridie, Jr.
(74) *Attorney, Agent, or Firm* — Hudak, Shunk & Farine Co. LPA

(57) ABSTRACT

A tripper assembly for use in advancing a clamshell lathe tool slide including a tool for milling a portion of a workpiece such as a tube or pipe, the tool slide being operatively connected to a rotatable ring of the clamshell lathe and the tripper assembly operatively connected to a stationary ring of the clamshell lathe. The design of the tripper assembly is such that the position, engaged or disengaged, of the tripper element can be easily ascertained.

19 Claims, 3 Drawing Sheets

U.S. PATENT DOCUMENTS

| | | |
|---|---|---|
| 6,427,567 B1 | 8/2002 | Ricci et al. |
| D466,132 S | 11/2002 | Ricci et al. |
| 6,619,164 B1 | 9/2003 | Ricci et al. |
| 6,799,494 B1 | 10/2004 | Ricci et al. |
| 6,901,828 B2 | 6/2005 | Ricci |
| 7,000,510 B1 | 2/2006 | Place et al. |
| 7,069,829 B2 | 7/2006 | Ricci et al. |
| 7,252,025 B2 | 8/2007 | Place et al. |
| 2006/0207395 A1* | 9/2006 | Place et al. .......... 82/113 |

OTHER PUBLICATIONS

"*Low Clearance Split Frame User's Manual*," E. H. Wachs Company, Lincolnshire, IL, Revision 7, Aug. 2007, pp. 1-124.

* cited by examiner

TRIPPER ASSEMBLY FOR A CLAMSHELL LATHE

CROSS-REFERENCE

This application claims the priority filing date of U.S. Provisional Application Ser. No. 61/204,041, filed Dec. 31, 2008, herein fully incorporated by reference.

FIELD OF THE INVENTION

The present invention relates to a tripper assembly for use in advancing a clamshell lathe tool slide including a tool for milling a portion of a workpiece such as a tube or pipe, the tool slide being operatively connected to a rotatable ring of the clamshell lathe and the tripper assembly operatively connected to a stationary ring of the clamshell lathe. The design of the tripper assembly is such that the position, engaged or disengaged, of the tripper element can be easily ascertained.

BACKGROUND OF THE INVENTION

Clamshell lathes are known in the art and can be utilized typically in industrial settings to mill a portion of a generally cylindrical pipe or tube. Non-limiting examples of clamshell lathes are disclosed in U.S. Pat. Nos. 4,739,685; 4,939,964; and 5,549,024. Clamshell lathes in some embodiments are designed as annular devices formed from semi-cylindrical halves connected together around a pipe to be milled. A stationary ring of the clamshell lathe is temporarily fixed to the pipe. A rotatable ring is operatively connected to the stationary ring and is rotatable for example by an air, hydraulic, or electrically-operated motor operatively connected to the rotatable ring. In some embodiments, the motor housing is connected to the stationary ring and has a drive gear that engages gearing located on the rotatable ring. A tool slide can be mounted on the rotatable ring and is adapted to hold a cutting tool for milling the pipe. The tool slide can include a feed mechanism that advances the tool slide and thus the cutting tool preferably in a radial direction toward the pipe in incremental steps upon a predetermined revolution of the ring gear.

Various tripper assemblies are known to the art to actuate the feed mechanism of the clamshell lathe.

U.S. Pat. No. 4,739,685 relates to a lathe having a stationary member and a rotating gear member. A circular race member is connected to the gear member and held in position by means of bearings. Preferably, the bearings have longitudinal axes perpendicular to the top surface of the stationary member. Further, mounting brackets are utilized to reportedly quickly and easily mount a motor onto the stationary member. A two part tool module is also disclosed.

U.S. Pat. No. 5,881,618 relates to a shield slide mechanism for moving the cutting tool of a clamshell lathe. By shielding the mechanism, metal chips created during the cutting process are reportedly precluded from jamming the mechanism and preventing the controlled movement of the cutting tool. The tool block slide assembly incorporates a cam lever actuated feed screw operating through a unidirectional roller clutch rather than a conventional starwheel.

WO 2008/052106 relates to a tripper assembly described for use with a clamshell lathe having a stationary ring and a rotatable ring including a tool module for holding a tool bit. The tool module has a starwheel with a plurality of teeth coupled to a feed screw for moving a tool bit in a radial direction with respect to the rings as the starwheel rotates. The tripper assembly includes a bracket affixed to the stationary ring of the lathe, a radially extending shaft mounted in the bracket, a pin holder mounted on the shaft, and a radially extending pin held by the pin holder. Rotation of the shaft moves the pin along an arc to move the pin between an engaged position and a disengaged position with respect to the starwheel. When the pin is at the engaged position, upon each revolution of the starwheel, the pin engages a tooth on the starwheel to rotate the starwheel.

SUMMARY OF THE INVENTION

In view of the above, it would be desirable to provide a tripper assembly for a clamshell-type lathe that is furnished with a reliable feature for advancing the actuating mechanism of a tool slide.

A further object of the present invention is to provide a tripper assembly with a plurality of components that are adjustable in order to vary features of the assembly such as height in relation to a central axis of the clamshell lathe to which the tripper assembly is adapted to be connected.

Still another object of the present invention is to provide a tripper assembly having a tripper element movable from an engaged position to a disengaged position, wherein the position of the tripper element can be easily ascertained.

A further object of the invention is to provide a tripper element having an end movable in a non-linear direction, such as an arc, in relation to a pivot point or member, namely a bolt of the tripper assembly which is preferably connected to a tripper bracket perpendicular to a radial line extending from a central axis of the clamshell lathe, or perpendicular to the longitudinal length of the tripper bracket.

In one aspect of the invention, a tripper assembly for a clamshell lathe is disclosed, the clamshell lathe including a stationary ring adapted to be fixed to a substantially cylindrical workpiece and a rotatable ring operatively connected to the stationary ring, the rotatable ring, including a tool slide, is adapted to hold a tool for milling the workpiece, the tool slide having a rotatable feed screw having an activating mechanism for moving the tool slide in a radial direction with respect to a central axis of the clamshell lathe, the tripper assembly comprising a clamshell connector bracket adapted to be affixed to the stationary ring of the clamshell lathe, a tripper bracket attached to the connector bracket, a rocker body rotatably connected to the tripper bracket by a pivot member, a handle connected to the rocker body, and a tripper element connected to the rocker body and movable between an engaged position adapted to engage the activating mechanism once during each revolution of the rotatable ring and rotate the feed screw and a disengaged position located a greater radial distance from the central axis and at a different angle from the central axis as compared to the engaged position, upon activation of the handle.

In another aspect of the present invention, a tripper assembly for a clamshell lathe is disclosed, the clamshell lathe including a stationary ring adapted to be fixed to a substantially cylindrical workpiece and a rotatable ring operatively connected to the stationary ring, the rotatable ring, including a tool slide, is adapted to hold a tool for milling the workpiece, the tool slide having a rotatable feed screw having an activating mechanism for moving the tool slide in a radial direction with respect to a central axis of the clamshell lathe, the tripper assembly comprising a tripper bracket adapted to be operatively attached to the stationary ring of the clamshell lathe, a rocker body rotatably connected to the tripper bracket by a pivot member, and a tripper element connected to the rocker body and movable between an engaged position adapted to engage the activating mechanism one or more times during each revolution of the rotatable ring and a disengaged position, wherein the tripper bracket has the longitudinal length extending in a direction along an x axis that is perpendicular to a z axis adapted to be parallel to a central axis of the clamshell lathe, wherein the tripper element has an end that, in the engaged position, is located at a point (0,0,0) in a three dimensional coordinate system having the x axis, a y axis and the z axis (x,y,z), and wherein in the disengaged position the tripper element end is located at a point wherein at least the x and z coordinates are each not zero.

In another aspect of the invention, a method for utilizing a tripper assembly for a clamshell lathe is disclosed, comprising the steps of affixing a tripper assembly to a stationary ring of the clamshell lathe, wherein the lathe is adapted to be fixed to a substantially cylindrical workpiece, and a rotatable ring is operatively connected to the stationary ring, the rotatable ring, including a tool slide, is adapted to hold a tool for milling the workpiece, the tool slide having a rotatable feed screw having an activating mechanism for moving the tool slide in a radial direction with respect to a central axis of the clamshell lathe, the tripper assembly comprising a clamshell connector bracket adapted to be affixed to the stationary ring of the clamshell lathe, a tripper bracket attached to the connector bracket, a rocker body rotatably connected to the tripper bracket by a pivot member, a tripper element connected to the rocker body and movable between an engaged position adapted to engage the activating mechanism once during each revolution of the rotatable ring and a disengaged position, wherein the tripper bracket has the longitudinal length extending in a direction along an x axis that is perpendicular to a z axis parallel to the central axis, the x and z axes being part of a three dimensional coordinate system having x, y and z axes perpendicular to each other, wherein the tripper element has an end that, in the engaged position, is located at a point (0,0,0) in a three dimensional coordinate system having the x, y and z axes (x,y,z), and wherein in the disengaged position, the tripper element end is located at a point wherein at least the x and z coordinates are each not zero, and moving the tripper element from the engaged to the disengaged position, wherein the tripper element end is located at a point (−x,y,+z) wherein the element end is located upward and further away from the connector bracket as compared to the location of the end in the engaged position.

BRIEF DESCRIPTION OF THE DRAWINGS

The invention will be better understood and other features and advantages will become apparent by reading the detailed description of the invention, taken together with the drawings, wherein.

DETAILED DESCRIPTION OF THE INVENTION

Figure 4:
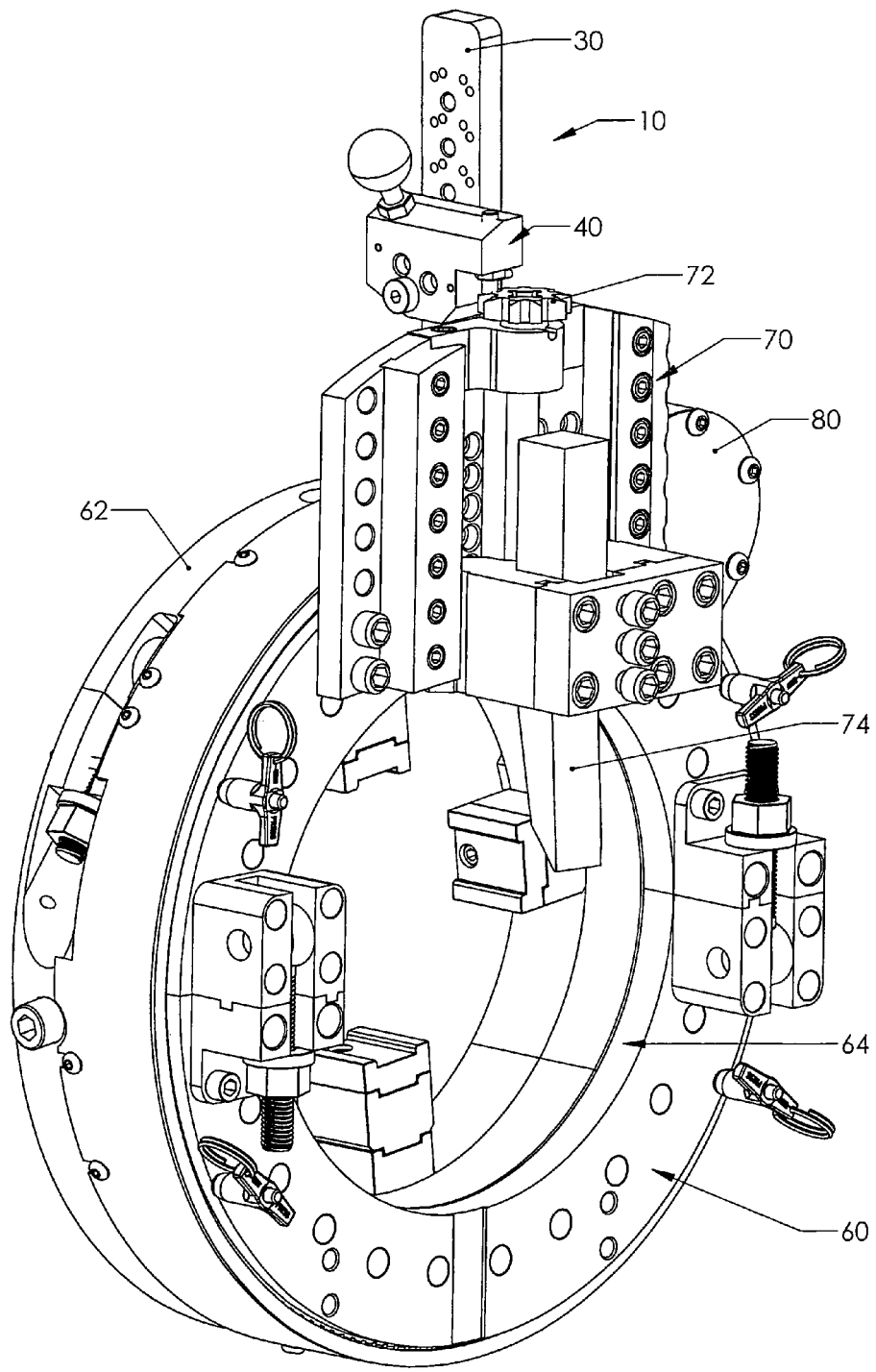
FIG. 4 is a perspective view of a clamshell lathe having a tripper assembly of the present invention connected thereto.

The invention relates to a tripper assembly for a clamshell lathe, particularly a clamshell lathe having a tool slide that orbits around a central axis, with the tool slide including a feed mechanism, which is adapted to be actuated by the tripper assembly, see FIG. 4 for one embodiment of a clamshell lathe.

Figure 1:
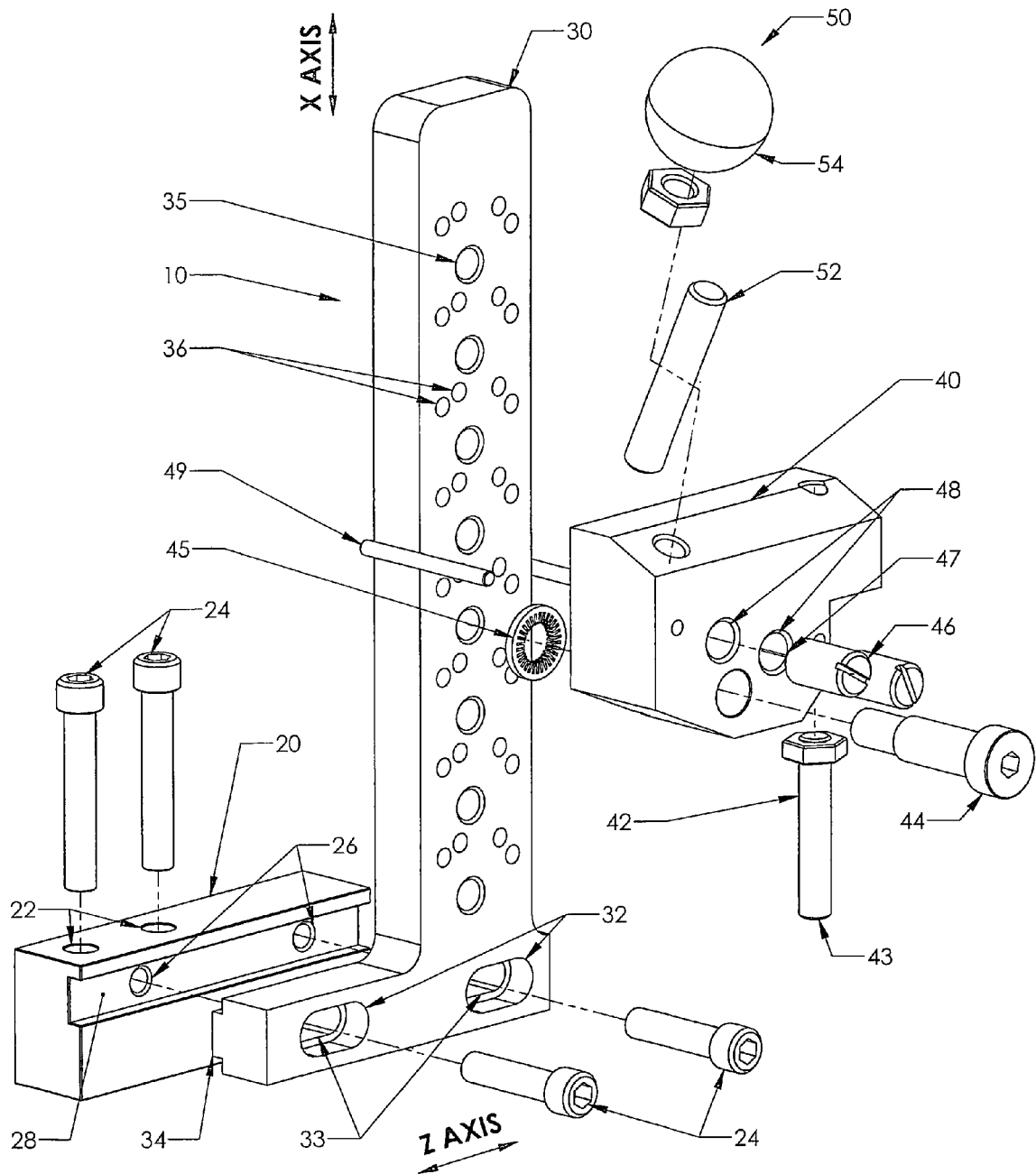
FIG. 1 is an exploded view of one embodiment of the tripper assembly of the present invention.
Figure 2:
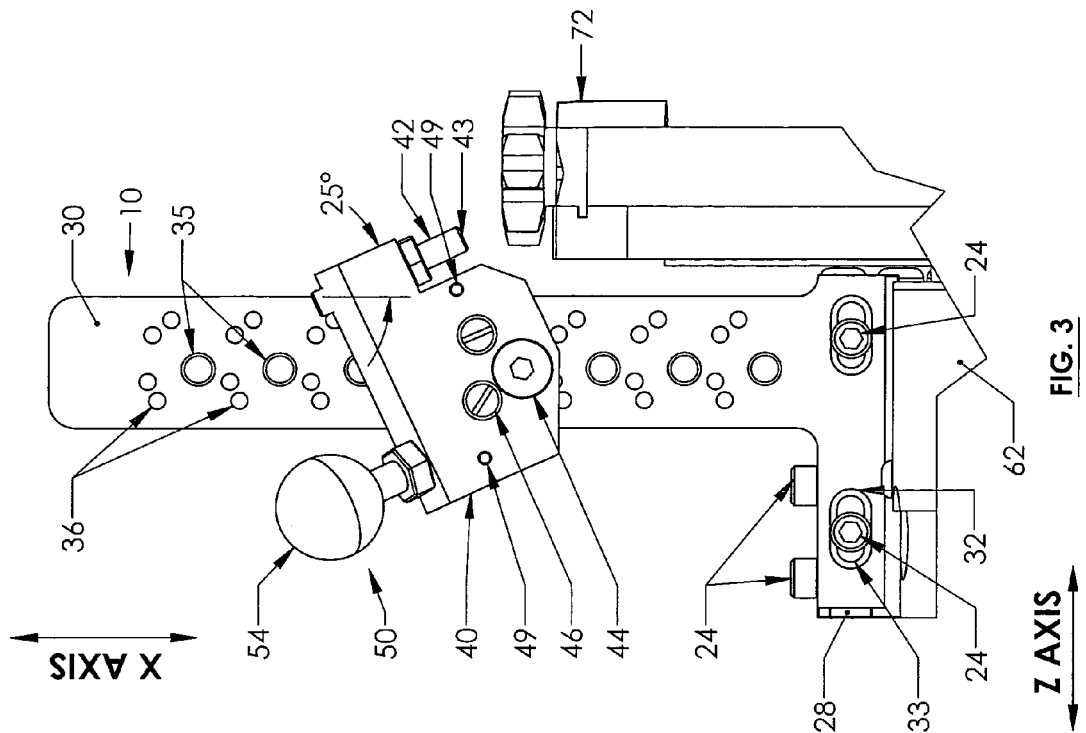
FIG. 2 is a side elevational view of a tripper assembly mounted on a stationary ring of a clamshell lathe, wherein the tripper assembly is in an engaged position and adapted to actuate a feed mechanism of a tool slide operatively fixed to a rotating ring of the clamshell lathe.
Figure 3:
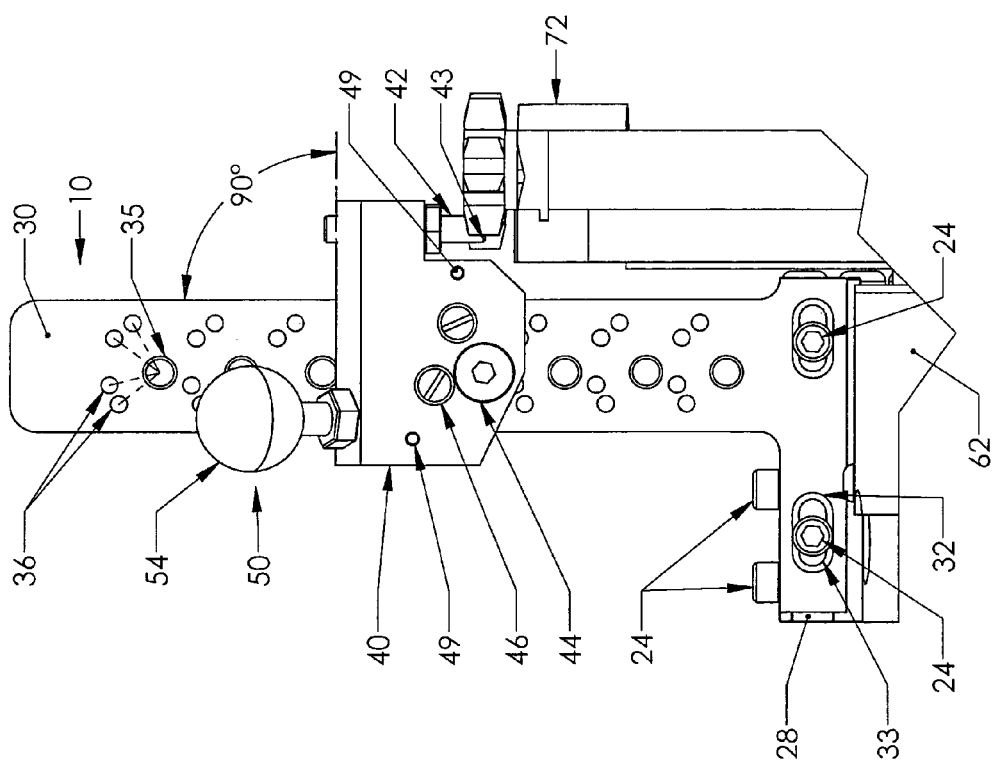
FIG. 3 is a side elevational view of a tripper assembly mounted on a stationary ring of a clamshell lathe, wherein the tripper assembly is in a disengaged position.

The invention will be better understood with reference to the drawings, wherein FIG. 1 illustrates one embodiment of a tripper assembly 10 that includes a clamshell connector bracket 20 adapted to be mounted on a stationary ring 62 of the clamshell lathe such as illustrated in FIGS. 2 and 3. In one embodiment, the clamshell connector bracket 20 includes one or more and preferably two or more apertures 22, therein capable of accepting a fastener 24 that can be secured to the stationary ring of the clamshell lathe. An aperture 22 of the clamshell connector bracket 20, when utilizing a fastener 24 such as a threaded bolt, can have a single diameter through which the threaded portion of a fastener extends with the head of the fastener 24 sized larger than the aperture. In other embodiments, the aperture 22 can include a countersink in order to accommodate at least a portion of the head of fastener 24.

A tripper bracket 30 is connected to clamshell connector bracket 20 in a manner that allows for height of the tripper bracket 30 to be adjusted in relation to the clamshell connector bracket 20 and preferably in relation to a direction parallel to a central axis of the clamshell lathe. Stated in another manner, the tripper bracket 30 can be fixed to the clamshell lathe through the clamshell connector bracket 20 at one of a plurality of positions along a z axis parallel to the central axis of the clamshell lathe, see FIG. 1. The adjustability of the tripper bracket 30 allows the tripper element 42 to be placed at a desired axial height, i.e., along the z axis in order to actuate the feed mechanism 72 of the clamshell lathe.

In one embodiment, the tripper bracket 30 is provided with one or more elongated slots 32 extending through lateral surfaces of the tripper bracket 30. Each elongated slot 32 preferably includes a countersunk bore 33 for accepting at least a portion of the head of a fastener, which can be connected through a second aperture 26 of the clamshell connector bracket 20. One method for adjusting the height of the tripper bracket 30 in relation to the clamshell connector bracket 20 involves inserting fastener 24 through elongated slot 32 in the tripper bracket 30 and into a tripper bracket aperture 26 on the clamshell connector bracket 20 which is preferably threaded. The tripper bracket 30 is adjusted axially along the z axis until the tripper element 42 operatively connected to the tripper bracket 30 is located at a desired axial height along the z axis. Then, the fastener 24 is used to fix the tripper bracket 30 to the clamshell connector bracket 20. In order to aid in alignment of the tripper bracket 30 in relation to the clamshell connector bracket, in a further embodiment the clamshell connector bracket 20 is provided with a preferably linear channel 28 that is mateable with a male projection 34 of the tripper bracket, with projection 34 generally being a raised surface extending along the z axis in a direction parallel to the longitudinal axis of the clamshell lathe. In an alternative embodiment, the tripper bracket 30 can be fixed to the clamshell connector bracket 20 at a plurality of different heights, wherein one or more of the pair include two or more spaced apertures along the indicated z axis parallel to the central axis of the clamshell lathe. The end result of adjustment of the tripper bracket 30 in relation to the clamshell connector bracket 20 allows proper or desired engagement of the tripper element 42 and a toothed gear 73 of the feed mechanism 72.

The tripper bracket 30 further includes at least one or preferably a plurality of spaced apertures 35 for attaching a pivot member 44, such as, but not limited to a bolt, to the tripper bracket 30. When a plurality of pivot member apertures 35 are utilized, they are preferably arranged on an x axis perpendicular to the z axis, with the x axis generally extending along a radial line from the central axis of the clamshell lathe. Generally from about 2 to about 8 and preferably from about 3 to about 4 apertures 35 are present. Pivot member apertures 35 are preferably threaded and mateable with threads of an end portion of pivot member 44. A pivot member retainer nut 45 is threaded onto pivot member 44 after the same is extended through rocker body 40 so that the pivot member and rocker body can be maintained in an assembly if it is desired to move the same from one aperture 35 to another. Spacing between apertures 35 is generally relative to the spacing on a base of the tool slide 70. Therefore, the tripper bracket configuration can accommodate different size tool slides.

The rocker body 40 is operatively connected to the tripper bracket 30 through pivot member 44 such that the tripper element 42, connected to the rocker body 40, is movable, i.e., pivotable from an engaged position, see FIG. 2, wherein a tripper element end 43 of the tripper element 42 has a coordinate, based on a three dimensional Cartesian coordinate system having three axes (x,y,z) perpendicular to each other, for example (0,0,0), to a disengaged position, wherein the tripper element end 43 has a coordinate (x,y,z) wherein at least x and z are each, independently, not 0. By varying the location of the tripper element end 43 of the tripper element 42, and at least the x and z axes, the user can relatively easily visually determine if the tripper element 42 is engaged or disengaged. For example, FIG. 3 illustrates the tripper element end 43 in a (−x,y,+z) coordinate in relation to the (0,0,0) initial position of the tripper element end 43, wherein the tripper element end 43 is located in a position closer to the outer end of the tripper bracket 30 in relation to the x axis and upwards in relation to the z axis when compared to the end 43 location in the engaged position. Although the tripper element end 43 is not shown moved in the y axis between FIGS. 2 and 3, such movement is possible in some embodiments. Furthermore, the tripper element 42 is preferably fashioned as an elongated linear rod which is preferably oriented parallel to the x axis in the engaged position and oriented at an angle as compared to the x axis in the disengaged position. In one embodiment, the angle between the end 43 of the tripper element between engaged and disengaged position ranges from about 20° to about 90°, with about 25° being preferred. An angle of 25° is illustrated in FIG. 3 compared to the engaged position of FIG. 2.

A handle 50 is connected to the rocker body 40 that can be used for manipulating the tripper element 42. Preferably the handle 50 is located on a surface rocker body 40 located away from the clamshell lathe and the tripper element 42. The location of the handle 50 in such a location keeps the user's hand away from a potentially moving rotatable ring of the clamshell lathe. Additionally, the handle provides a user the ability to use leverage, provides a comfortable grip, and allows for positive control of the rocker body. In one embodiment, the handle includes a stem 52 connected to the rocker body 40 and a head 54 such as a ball or knob mounted on the stem 52 for manipulation by the user.

The tripper bracket 30 is also provided with at least two recesses 36 arranged, preferably radially, around pivot member aperture 44 in which a spring loaded projection 47 such as a ball of spring plunger 46 can be situated to aid in maintaining the tripper element 42 in an engaged or disengaged position. In one embodiment, the spring plunger 46 has an exterior surface that is threaded into aperture 48 present in the rocker body 40. Ball 47 is operatively connected to a spring located in the spring plunger 46 and can be pushed into the body of spring plunger 46 when the ball is moved across the generally planar surface of the tripper bracket 30 that does not include a recess 36 when the rocker body 40 is moved between the engaged and disengaged positions. In one preferred embodiment, the rocker body 40 includes a pair of spring plungers 46 and each rocker body aperture 35 includes two recesses 36 for each spring plunger 46. In the embodiment, the recesses 36 are arranged in an arc or in a radial manner around the rocker body aperture 35 and each spring plunger 46 can be moved into and out of its provided-for recesses 36 in the tripper bracket 30 as the rocker body 40 is rotated about the rocker body pivot member 44. The spring plungers allow for desirable control of the tripper element.

In a further embodiment, the rocker body 40 is provided with a pair of positive stops 49 that extend outwardly from the rocker body. One of the positive stops 49 extends above and across an upper surface of the tripper bracket 30 and the second positive stop extends below and across at least a lower surface of tripper bracket 30. One of the positive stops, namely the upper positive stop 49, is in contact with the upper surface of tripper bracket 30 when the tripper element 42 is in the engaged position and the lower positive stop 49 contacts the lower surface of tripper bracket 30 when the tripper element 42 is in the disengaged position. Positive stops 48 provide a further mode of providing correct alignment for the tripper element 42. Use of positive stops 49 prevent potential damage to components of the tripper assembly by creating maximum travel limits in the engaged and disengaged modes. Positive stops reduce safety issues related to overtravel of the rocker body of the tripper assembly.

As indicated hereinabove, the clamshell lathe 60 stationary ring 62 is connected to a cylindrical pipe to be milled. A drive motor is utilized to turn the rotatable ring 64 operatively connected to the stationary ring 62 whereby the rotatable ring rotates about the central axis of the workpiece. Examples of clamshell lathes are set forth in U.S. Pat. Nos. 4,739,685 and 5,881,618, herein fully incorporated by reference.

The tool slide 70 affixed to the outer surface of the rotatable ring 64 includes a feed mechanism 72 for advancing the tool slide 70 in a radial direction towards the workpiece in incremental steps upon a predetermined revolution of the rotatable ring. In one embodiment as illustrated in FIG. 2, the feed mechanism includes a toothed gear 73 which is adapted to be engaged by the tripper element 42 of the tripper assembly 10 of the present invention. The clamshell connector bracket 20 is connected via fasteners 24 to a desired location on the outer surface of the stationary ring 62. As illustrated in FIGS. 2 and 3, the clamshell connector bracket 20 has fasteners 24 extending there through which are threaded into the stationary ring 62. The height of the tripper bracket 30 is adjusted utilizing elongated slots 32 and fasteners 24 which are secured in apertures 26 of clamshell connector bracket 20. Pivot member 44, which extends through rocker body 40, is connected to one of the apertures 35 of tripper bracket 30 along the x axis such that in the engaged position, tripper element 42 is adapted to actuate the toothed gear of the feed mechanism of the tool slide.

In the engaged position, the tripper element 42, such as shown in FIG. 2, will engage a tooth of the gear 73 and rotate the feed mechanism 72 that advances the tool slide 70 radially towards the workpiece about which the tool connected to the rotating ring is orbiting. As illustrated in FIG. 2, the tripper element has a longitudinal length that is generally parallel to the x axis.

When the handle 50 of the rocker body 40 is actuated, the tripper element 42 is rotated from the engaged position, shown in FIG. 2, to the disengaged position as illustrated in FIG. 3. In the disengaged position, the tripper element 42 will not contact the gear 73 of the feed mechanism 72 and thus will not advance the tool slide 70 attached to the rotatable ring 64 of the clamshell lathe 60.

While in accordance with the patent statutes the best mode and preferred embodiment have been set forth, the scope of the invention is not intended to be limited thereto, but only by the scope of the attached claims.

What is claimed is:

1. A tripper assembly for a clamshell lathe, the clamshell lathe, including a stationary ring, is adapted to be fixed to a substantially cylindrical workpiece and a rotatable ring operatively connected to the stationary ring, the rotatable ring, including a tool slide, is adapted to hold a tool for milling the workpiece, the tool slide having a rotatable feed screw having an activating mechanism for moving the tool slide in a radial direction with respect to a central axis of the clamshell lathe, the tripper assembly comprising:
 a clamshell connector bracket adapted to be affixed to the stationary ring of the clamshell lathe;
 a tripper bracket attached to the connector bracket;
 a rocker body rotatably connected to the tripper bracket by a pivot member; and;
 a tripper element connected to the rocker body and movable between an engaged position adapted to engage the activating mechanism once during each revolution of the rotatable ring and rotate the feed screw and a disengaged position located a greater radial distance from the central axis and at a different angle from the central axis as compared to the engaged position, upon activation of the handle.

2. The tripper assembly for a clamshell lathe according to claim 1, wherein a spring plunger is operatively connected to either of the rocker body or the tripper bracket and is retained in indentations present in the rocker body or tripper bracket not having the spring plunger when the tripper element is in the engaged position and disengaged position.

3. The tripper assembly for a clamshell lathe according to claim 1, wherein the rocker body includes a first stop extending laterally outward from the rocker body that contacts an upper surface of the tripper bracket when the tripper bracket is in the disengaged position.

4. The tripper assembly for a clamshell lathe according to claim 3, wherein the rocker body includes a second stop that contacts a lower surface of the tripper bracket when the tripper bracket is in the engaged position.

5. The tripper assembly for a clamshell lathe according to claim 2, wherein the rocker body is rotatable around the pivot member on an axis substantially perpendicular to the central axis, and wherein the tripper element has an end that rotates on a portion of a radial arc around the pivot member.

6. The tripper assembly for a clamshell lathe according to claim 2, wherein the tripper bracket includes a plurality of pivot member apertures spaced at different radial lengths from the central axis through one of which the pivot member can be connected to the tripper bracket.

7. The tripper assembly for a clamshell lathe according to claim 2, wherein the tripper bracket or the clamshell connector bracket includes an elongated slot extending in a direction parallel to the central axis through which a bolt connects the tripper bracket to the clamshell connector bracket, and wherein the tripper bracket is adjustable in relation to the clamshell connector bracket utilizing the slot.

8. The tripper assembly for a clamshell lathe according to claim 1, wherein the tripper element has a rod having a length oriented substantially parallel to an x axis in the engaged position and oriented in an angle of about 20° to about 90° compared to the x axis in the disengaged position.

9. A tripper assembly for a clamshell lathe, the clamshell lathe including a stationary ring, adapted to be fixed to a substantially cylindrical workpiece, and a rotatable ring operatively connected to the stationary ring, the rotatable ring, including a tool slide, is adapted to hold a tool for milling the workpiece, the tool slide having a rotatable feed screw having an activating mechanism for moving the tool slide in a radial direction with respect to a central axis of the clamshell lathe, the tripper assembly comprising:
 a tripper bracket adapted to be operatively attached to the stationary ring of the clamshell lathe;
 a rocker body rotatably connected to the tripper bracket by a pivot member; and
 a tripper element connected to the rocker body and movable between an engaged position adapted to engage the activating mechanism one or more times during each revolution of the rotatable ring and a disengaged position, wherein the tripper bracket has the longitudinal length extending in a direction along an x axis that is perpendicular to a z axis adapted to be parallel to a central axis of the clamshell lathe, wherein the tripper element has an end that, in the engaged position, is located at a point (0,0,0) in a three dimensional coordinate system having the x axis, a y axis and the z axis (x,y,z), and wherein in the disengaged position the tripper element end is located at a point wherein at least the x and z coordinates are each not zero.

10. The tripper assembly for a clamshell lathe according to claim 8, wherein a tripper assembly further comprises a clamshell connector bracket adapted to be affixed to the stationary ring of the clamshell lathe, and the tripper bracket attached to the connector bracket, wherein in the disengaged position, the tripper element end is located at a point (−x,y,+z) wherein the end is located upward and further away from the connector bracket as compared to the location of the end in the engaged position.

11. The tripper assembly for a clamshell lathe according to claim 10, wherein the rocker body includes a first stop extending laterally outward from the rocker body that contacts an upper surface of the tripper bracket when the tripper bracket is in the engaged position.

12. The tripper assembly for a clamshell lathe according to claim 11, wherein the rocker body includes a second stop that contacts a lower surface of the tripper bracket when the tripper bracket is in the disengaged position.

13. The tripper assembly for a clamshell lathe according to claim 11, wherein a spring plunger is operatively connected to either of the rocker body or the tripper bracket and is retained in indentations present in the rocker body or tripper bracket not having the spring plunger when the tripper element is in the engaged position and disengaged position.

14. The tripper assembly for a clamshell lathe according to claim 9, wherein the rocker body is rotatable about the pivot member on an axis parallel to the y axis, and wherein the tripper element has an end that rotates on a portion of the radial arc around the pivot member.

15. The tripper assembly for a clamshell lathe according to claim 14, wherein the tripper element comprises a rod having a length oriented substantially parallel to the x axis in the engaged position and oriented in an angle of about 20° to about 90° compared to the x axis in the disengaged position.

16. A method for utilizing a tripper assembly for a clamshell lathe, comprising the steps of:
 affixing a tripper assembly to a stationary ring of the clamshell lathe, wherein the lathe is adapted to be fixed to a substantially cylindrical workpiece, and a rotatable ring is operatively connected to the stationary ring, the rotatable ring, including a tool slide, is adapted to hold a tool for milling the workpiece, the tool slide having a rotatable feed screw having an activating mechanism for moving the tool slide in a radial direction with respect to a central axis of the clamshell lathe, the tripper assembly comprising:

a clamshell connector bracket adapted to be affixed to the stationary ring of the clamshell lathe;

a tripper bracket attached to the connector bracket;

a rocker body rotatably connected to the tripper bracket by a pivot member;

a tripper element connected to the rocker body and movable between an engaged position adapted to engage the activating mechanism once during each revolution of the rotatable ring and a disengaged position, wherein the tripper bracket has the longitudinal length extending in a direction along an x axis that is perpendicular to a z axis parallel to the central axis, the x and z axes being part of a three dimensional coordinate system having x, y and z axes perpendicular to each other, wherein the tripper element has an end that, in the engaged position, is located at a point (0,0,0) in a three dimensional coordinate system having the x, y and z axes (x,y,z), and wherein in the disengaged position, the tripper element end is located at a point wherein at least the x and z coordinates are each not zero; and moving the tripper element from the engaged to the disengaged position, wherein the tripper element end is located at a point (−x,y,+z), wherein the element end is located upward and further away from the connector bracket as compared to the location of the end in the engaged position.

17. The method according to claim 16, wherein moving the tripper element comprises rotating the rocker body around the pivot member.

18. The method according to claim 16, wherein the tripper element is moved in a radial direction around the pivot member.

19. The method according to claim 16, further including the step of moving the tripper element to the engaged position and allowing the tripper element to engage the activating mechanism.

\* \* \* \* \*